(12) United States Patent
Relyea et al.

(10) Patent No.: US 7,721,254 B2
(45) Date of Patent: May 18, 2010

(54) PROGRAMMING INTERFACE FOR A COMPUTER PLATFORM

(75) Inventors: Rob Relyea, Bellevue, WA (US); Jeff Bogdan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1101 days.

(21) Appl. No.: 10/693,854

(22) Filed: Oct. 24, 2003

(65) Prior Publication Data

US 2005/0091575 A1 Apr. 28, 2005

(51) Int. Cl.
- G06F 9/44 (2006.01)
- G06F 3/00 (2006.01)
- G09G 5/02 (2006.01)
- G09G 5/00 (2006.01)

(52) U.S. Cl. ............... 717/109; 717/163; 719/328; 345/594; 345/621; 345/650

(58) Field of Classification Search ............... 717/109
See application file for complete search history.

(56) References Cited

U.S. PATENT DOCUMENTS

| | | | |
|---|---|---|---|
| 5,301,301 A | 4/1994 | Kodosky et al. | |
| 5,301,336 A | 4/1994 | Kodosky et al. | |
| 5,603,034 A | 2/1997 | Swanson | |
| 5,862,379 A * | 1/1999 | Rubin et al. | 717/109 |
| 5,872,973 A | 2/1999 | Mitchell et al. | |
| 5,893,107 A | 4/1999 | Chan et al. | |
| 5,956,506 A | 9/1999 | Cobb et al. | |
| 6,091,411 A | 7/2000 | Straub et al. | |
| 6,104,391 A | 8/2000 | Johnston, Jr. et al. | |
| 6,188,399 B1 | 2/2001 | Voas et al. | |
| 6,353,451 B1 | 3/2002 | Teibel et al. | |
| 6,392,671 B1 | 5/2002 | Glaser | |
| 6,466,228 B1 | 10/2002 | Ulrich et al. | |
| 6,598,219 B1 | 7/2003 | Lau | |
| 7,017,162 B2 * | 3/2006 | Smith et al. | 719/328 |
| 2001/0045961 A1 * | 11/2001 | Stoakley et al. | 345/744 |
| 2002/0054046 A1 | 5/2002 | Evans et al. | |
| 2003/0028685 A1 * | 2/2003 | Smith et al. | 709/328 |
| 2003/0093419 A1 | 5/2003 | Bangalore et al. | |
| 2003/0101439 A1 * | 5/2003 | Desoli et al. | 717/148 |
| 2003/0167277 A1 * | 9/2003 | Hejlsberg et al. | 707/102 |
| 2003/0167355 A1 | 9/2003 | Smith et al. | |
| 2003/0167356 A1 * | 9/2003 | Smith et al. | 709/328 |

(Continued)

FOREIGN PATENT DOCUMENTS

EP 0371941 6/1990

(Continued)

OTHER PUBLICATIONS

Priya Lakshminarayanan, "The .NET Schema Object Model", Dec. 4, 2002, XML.COM, O'Reily Media, Inc., pp. 1-17, <http://www.xml.com/pub/a/2002/12/04/som.html>.*

(Continued)

Primary Examiner—Michael J Yigdall
Assistant Examiner—Ben C Wang
(74) Attorney, Agent, or Firm—Lee & Hayes, PLLC

(57) ABSTRACT

A programming interface provides functions for generating applications, documents, media presentations and other content. These functions allow developers to obtain services from an operating system, object model service, or other system or service.

17 Claims, 9 Drawing Sheets

U.S. PATENT DOCUMENTS

| | | | |
|---|---|---|---|
| 2003/0172196 A1* | 9/2003 | Hejlsberg et al. | ........... 709/328 |
| 2003/0177282 A1* | 9/2003 | Hejlsberg et al. | ........... 709/328 |
| 2003/0184590 A1 | 10/2003 | Will | |
| 2003/0200254 A1 | 10/2003 | Wei | |

FOREIGN PATENT DOCUMENTS

| | | |
|---|---|---|
| EP | 0442676 A2 | 8/1991 |
| EP | 0860773 | 8/1998 |
| EP | 1 077 404 | 2/2001 |
| EP | 1077404 A2 | 2/2001 |
| EP | 1143334 A2 | 10/2001 |
| EP | 1283465 | 2/2003 |
| EP | 1536451 A1 | 6/2005 |
| KR | 20010076789 A | 8/2001 |
| KR | 20020040588 A | 5/2002 |
| RU | 2157000 C2 | 9/2000 |
| RU | 2212118 C2 | 9/2003 |
| WO | WO03065173 A2 | 8/2003 |

OTHER PUBLICATIONS

Powers et al., "Visual Basic Programmer's Guide to the .NET Framework Class Library", Jan. 2, 2002, Sams, pp. 1-9.*

"Programmer's Guide to the Java™ 2D API", Java™ 2 SDK, Standard Edition 1.4 version, Apr. 24, 2001. web site: http://web.archive.org/web/20030405075635/http://java.sun.com/j2se/1.4.2/docs/guide/2d/spec/j2d-bo...,printed Sep. 16, 2004, 5 pages.

"Java™ 2 Platform, Standard Edition, v 1.4.1 API Specification", web page: http://web.archive.org/web/20030210134055/http://java.sun.com/j2se/1.4.1/docs/api/overview-summary.html, 2002, printed Sep. 16, 2004, 8 pages.

"API Documentation", web page: http://web.archive.org/web/20030207054709/java.sun.com/apis.html, Dec. 11, 2002, printed Sep. 16, 2004, 2 pages.

"Java™ 2 Platform, Standard Edition (J2SE™)", web page: http://web.archive.org/web/20030207125037/java.sun.com/docs/, Sep. 10, 2002, printed Sep. 16, 2004, 3 pages.

"Java™ 2 SDK, Standard Edition Documentation", Version 1.4.1, web page: http://web.archive.org/web/20030206231542/java.sun.com/j2se/1.4.1/docs/index.html, 2002, printed Sep. 16, 2004, 5 pages.

"Java™ 2 Platform, Standard Edition (J2SE™)", web page: http://web.archive.org/web/20030206212856/http://java.sun.com/j2se/, Jan. 27, 2003, printed Sep. 16, 2004, 3 pages.

Chan, P. et al., "The Java Class Libraries Passages", Java Class Libraries, Addision Wesley Longman, Reading, MA, US, 1998 pp. 303-395.

"API Documentation", Sun Microsystems, Inc., retrieved at <<http://web.archive.org/web/20030207054709/java.sun.com/apis.html>> on Sep. 16, 2004, Dec. 11, 2002, 2 pgs.

Chan, "The Java Class Libraries, Second Edition, vol. 2," java.awt Component, Oct. 1997, Addison Wesley, pp. 303-395.

Cox, "Picture the Future", Object Magazine, Jul.-Aug 1993, pp. 46-49.

"Java 2 Platform, Standard Edition (J2SE)", web page: http://web.archives.org/web/20030206212856/http://java.sun.com/js2e, printed Sep. 16, 2004, 3 pgs.

"Java 2 Platform, Standard Edition, v 1.4.1 API Specification", web page: http://web.archives.org/web/20030210134055/http://javasun.com/j2se/1.4.1/docs/api/overview-summary.html, 2002, printed Sep. 16, 2004, 8 pgs.

"Java 2 Platform, Standard Edition (J2SE)", web page: http://web.archives.org/web/20030207125037/java.sun.com/docs, Sep. 10, 2002, printed Sep. 16, 2004, 3 pgs.

"Java 2 SDK, Standard Edition Documentation", Version 1.4.1, web page: http://web.archives.org/web/20030206231542/java.sun.com/j2se/1.4.1/docs/iindex.html, 2002, printed Sep. 16, 2004, 5 pgs.

Lee, "The Java Class Libraries" Second Edition, vol. 2, Addison Wesley, Oct. 1997, pp. 303-395.

Lord, "Visual Programming for Visual Applications: A New Look for Computing", Object Magazine, Jul.-Aug 1994, pp. 37-40.

Marsan et al., "Computational Techniques for Automatically Tiling and Skinning Branched Objects", Computers & Graphics, 23 (1999), pp. 111-126.

"Programmer's Guide to the Java 2D API", Java 2 SDK, Standard Edition, 1.4 version, Apr. 24, 2001, web site: http://web.archives.org/web/20030405075635/http://java.sun.com/j2se/1.4.2/docs/guide/2d/spec/i2d-bo..., printed Sep. 16, 2004, 5 pgs.

White et al., "JDBC API Tutorial and Reference", Second Edition, Addison Wesley, 1999, pp. 99-103.

* cited by examiner

PROGRAMMING INTERFACE FOR A COMPUTER PLATFORM

TECHNICAL FIELD

This invention relates to software and to development of such software. More particularly, this invention relates to a programming interface that facilitates use of a software platform by application programs and computer hardware.

BRIEF DESCRIPTION OF ACCOMPANYING COMPACT DISCS

Accompanying this specification is a set of three compact discs that stores a Software Development Kit (SDK) for the Microsoft® Windows® Code-Named "Longhorn" operating system. The SDK contains documentation for the Microsoft® Windows® Code-Named "Longhorn" operating system. Duplicate copies of each of these three compact discs also accompany this specification.

The first compact disc in the set of three compact discs (CD 1 of 3) includes a file folder named "lhsdk" that was created on Oct. 22, 2003; it is 586 Mbytes in size, contains 9,692 sub-folders, and contains 44,292 sub-files. The second compact disc in the set of three compact discs (CD 2 of 3) includes a file folder named "ns" that was created on Oct. 22, 2003; it is 605 Mbytes in size, contains 12,628 sub-folders, and contains 44,934 sub-files. The third compact disc in the set of three compact discs (CD 3 of 3) includes a file folder named "ns" that was created on Oct. 22, 2003; it is 575 Mbytes in size, contains 9,881 sub-folders, and contains 43,630 sub-files. The files on each of these three compact discs can be executed on a Windows®-based computing device (e.g., IBM-PC, or equivalent) that executes a Windows®-brand operating system (e.g., Windows® NT, Windows® 98, Windows® 2000, Windows® XP, etc.). The files on each compact disc in this set of three compact discs are hereby incorporated by reference.

Each compact disc in the set of three compact discs itself is a CD-R, and conforms to the ISO 9660 standard. The contents of each compact disc in the set of three compact discs is in compliance with the American Standard Code for Information Interchange (ASCII).

BACKGROUND

Very early on, computer software came to be categorized as "operating system" software or "application" software. Broadly speaking, an application is software meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create a sophisticated program with millions of lines of code. For a popular operating system such as various versions of the Microsoft Windows® operating system, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

When developing applications, developers use a variety of tools to generate graphical items and other content. Additional tools are available to arrange graphical items and other data to be displayed or rendered. These tools are typically created by different entities or different tool developers. As a result, the tools do not provide a consistent programming environment. Thus, a developer using these different tools needs to learn how to utilize each of the tools and attempt to make them communicate with one another. These activities can be tedious and time consuming, taking time away from the actual development task at hand.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fractions of a second. These Web applications, however, were typically developed using the same operating system platform that was originally developed for standalone computing machines or locally networked computers. Unfortunately, in some instances, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation developed a network software platform known as the ".NET" Framework (read as "Dot Net"). Microsoft® NET is software for connecting people, information, systems, and devices. The platform allows developers to create Web services that will execute over the Internet. This dynamic shift was accompanied by a set of API functions for Microsoft's .NET™ Framework.

As use of the .NET™ Framework has become increasingly common, ways to increase the efficiency and/or performance of the platform have been identified. The inventors have developed a unique set of API functions to allow for such increased efficiency and/or performance.

SUMMARY

A programming interface, such as an API, provides functions for generating applications, documents, media presentations and other content. These functions allow developers to obtain services from an operating system, object model service, or other system or service. In one embodiment, the functions allow a developer to generate a graphical user interface.

BRIEF DESCRIPTION OF THE DRAWINGS

The same numbers are used throughout the drawings to reference like features.

DETAILED DESCRIPTION

This disclosure addresses an application program interface (API) for a network platform upon which developers can build Web applications and services. More particularly, an exemplary API is described for operating systems that make use of a network platform, such as the .NET™ Framework created by Microsoft Corporation. The .NET™ Framework is a software platform for Web services and Web applications implemented in the distributed computing environment. It represents the next generation of Internet computing, using open communication standards to communicate among loosely coupled Web services that are collaborating to perform a particular task.

In the described implementation, the network platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer of the page. Thus, virtually any data items can be identified, allowing Web pages to function like database records.

Through the use of XML and other open protocols, such as Simple Object Access Protocol (SOAP), the network platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls (e.g., a proxy, stub relationship) and SOAP/XML invocations.

It should be appreciated that in some of namespace descriptions below, descriptions of certain classes, interfaces, enumerations and delegates are left blank. More complete descriptions of these classes, interfaces, enumerations and delegates can be found in the subject matter of the compact discs that store the SDK referenced above.

Exemplary Network Environment

Figure 1:
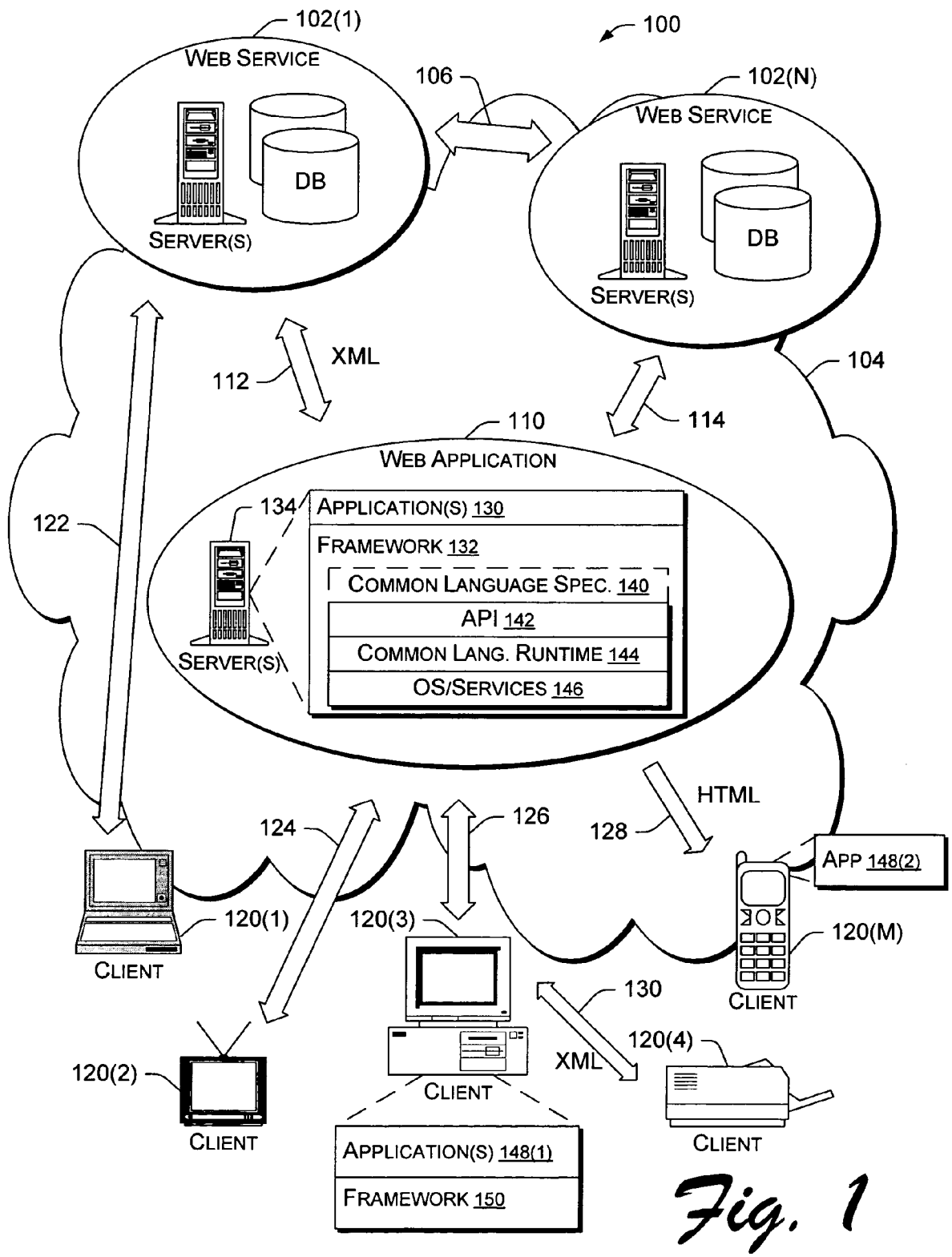
FIG. 1 illustrates a network architecture in which clients access Web services over the Internet using conventional protocols.

FIG. 1 shows a network environment 100 in which a network platform, such as the .NET™ Framework, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
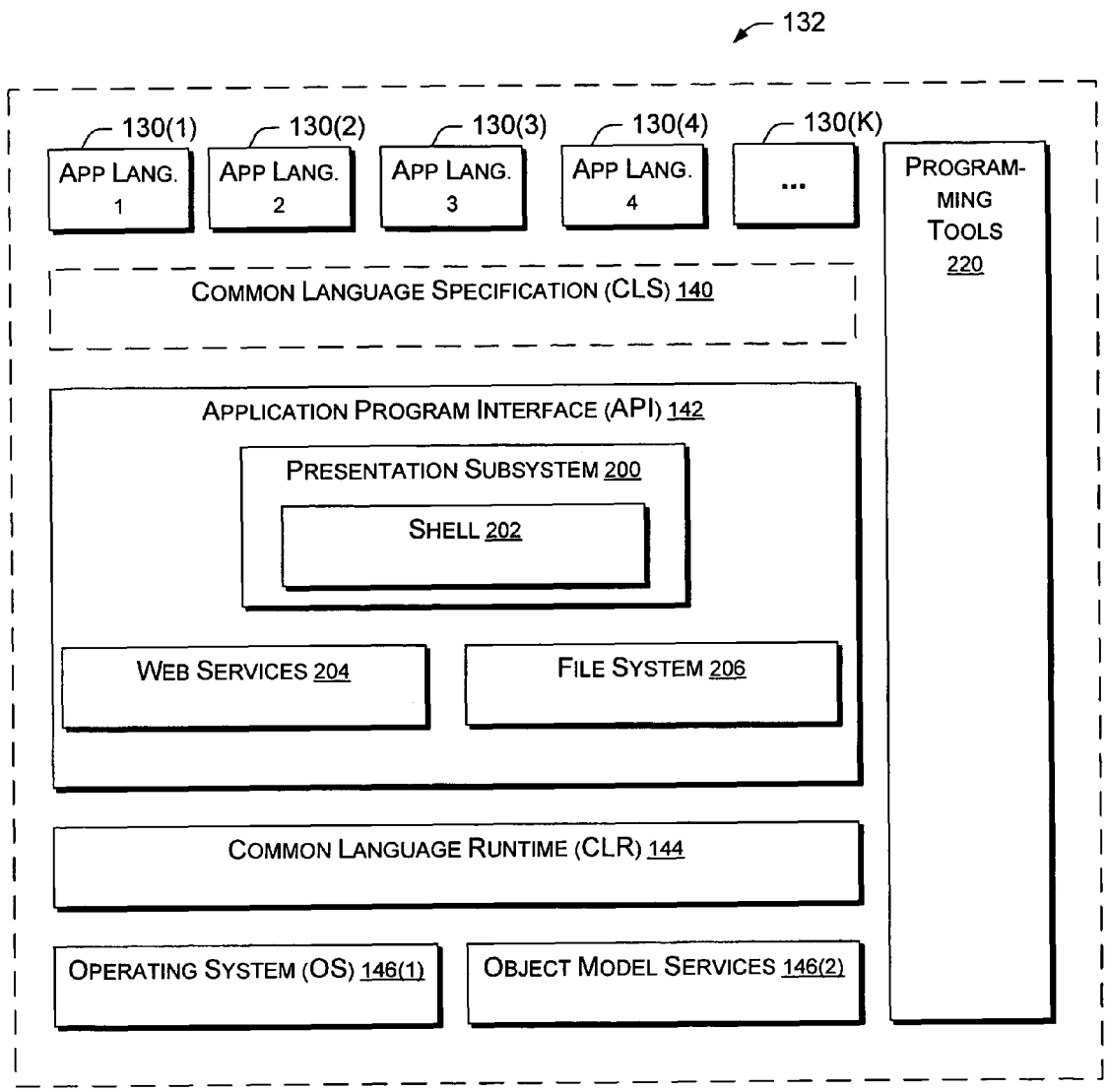
FIG. 2 is a block diagram of a software architecture for a network platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598, 105) and "Unified Data Type System and Method" filed Jul. 10, 2000 (Ser. No. 09/613,289), which are incorporated by reference.

The framework 132 encapsulates the operating system 146 (1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized to include three root namespaces. It should be noted that although only three root namespaces are illustrated in FIG. 2, additional root namespaces may also be included in API 142. The three root namespaces illustrated in API 142 are: a first namespace 200 for a presentation subsystem (which includes a namespace 202 for a user interface shell), a second namespace 204 for web services, and a third namespace 206 for a file system. Each group can then be assigned a name. For instance, types in the presentation subsystem namespace 200 can be assigned the name "Windows", and types in the file system namespace 206 can be assigned names "Storage". The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the file system namespace 206 can be referenced using the hierarchical name "System.Storage". In this way, the individual namespaces 200, 204, and 206 become major branches off of the System namespace and can carry a designation where the individual namespaces are prefixed with a designator, such as a "System." prefix.

The presentation subsystem namespace 200 pertains to programming and content development. It supplies types that allow for the generation of applications, documents, media presentations and other content. For example, presentation subsystem namespace 200 provides a programming model that allows developers to obtain services from the operating system 146(1) and/or object model services 146(2).

The shell namespace 202 pertains to user interface functionality. It supplies types that allow developers to embed user interface functionality in their applications, and further allows developers to extend the user interface functionality.

The web services namespace 204 pertains to an infrastructure for enabling creation of a wide variety of applications, e.g. applications as simple as a chat application that operates between two peers on an intranet, and/or as complex as a scalable Web service for millions of users. The described infrastructure is advantageously highly variable in that one need only use those parts that are appropriate to the complexity of a particular solution. The infrastructure provides a foundation for building message-based applications of various scale and complexity. The infrastructure or framework provides APIs for basic messaging, secure messaging, reliable messaging and transacted messaging. In the embodiment described below, the associated APIs have been factored into a hierarchy of namespaces in a manner that has been carefully crafted to balance utility, usability, extensibility and versionability.

The file system namespace 206 pertains to storage. It supplies types that allow for information storage and retrieval.

In addition to the framework 132, programming tools 210 are provided to assist the developer in building Web services and/or applications. One example of the programming tools 210 is Visual Studio™, a multi-language suite of programming tools offered by Microsoft Corporation.

Root API Namespaces

Figure 3:
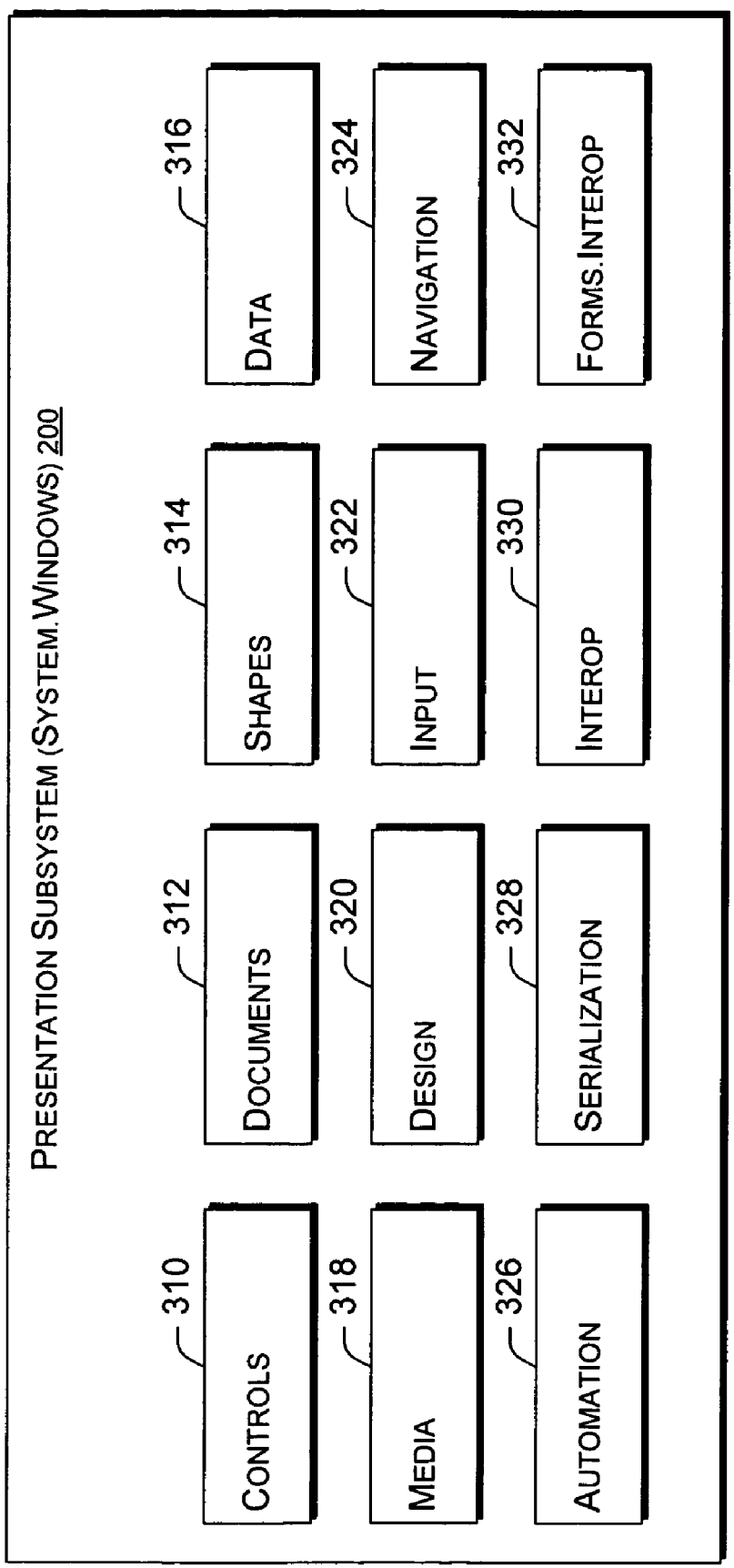
FIG. 3 is a block diagram of the presentation subsystem supported by the API, as well as function classes of the various API functions.

FIG. 3 shows a portion of the presentation subsystem 200 in more detail. In one embodiment, the namespaces are identified according to a hierarchical naming convention in which strings of names are concatenated with periods. For instance, the presentation subsystem namespace 200 is identified by the root name "System.Windows". Within the "System.Windows" namespace is another namespace for various controls, identified as "System.Windows.Controls", which further identifies another namespace for primitives (not shown) known as "System.Windows.Controls.Primitives". With this naming convention in mind, the following provides a general overview of selected namespaces of the API 142, although other naming conventions could be used with equal effect.

As shown in FIG. 3, the presentation subsystem 200 includes multiple namespaces. The namespaces shown in FIG. 3 represent a particular embodiment of the presentation subsystem 200. Other embodiments of the presentation subsystem 200 may include one or more additional namespaces or may omit one or more of the namespaces shown in FIG. 3.

The presentation subsystem 200 is the root namespace for much of the presentation functionality of the API 142. A controls namespace 310 includes controls used to build a display of information, such as a user interface, and classes that allow a user to interact with an application. Example controls include "Button" that creates a button on the display, "RadioButton" that generates a radio-style button on the display, "Menu" that creates a menu on the display, "ToolBar" that creates a toolbar on the display, "Image" that generates an image on the display and "TreeView" that creates a hierarchical view of information.

Certain controls are created by nesting and arranging multiple elements. The controls have a logical model that hides the elements used to create the controls, thereby simplifying the programming model. The controls can be styled and themed by a developer or a user (e.g., by customizing the appearance and behavior of user interface buttons). Some controls have addressable components that allow an individual to adjust the style of individual controls. Additionally, the controls can be sub-classed and extended by application developers and component developers. The controls are rendered using vector graphics such that they can be resized to fit the requirements of a particular interface or other display. The controls are capable of utilizing animation to enhance, for example, the interactive feel of a user interface and to show actions and reactions.

The controls namespace 310 includes one or more panels, which are controls that measure and arrange their children (e.g., nested elements). For example, a "DockPanel" panel arranges children by docking each child to the top, left, bottom or right side of the display, and fills-in the remaining space with other data. A particular panel may dock menus and toolbars to the top of the display, a status bar to the bottom of the display, a folder list to the left side of the display, and fills the rest of the space with a list of messages.

As mentioned above, System.Windows.Controls.Primitives is a namespace that includes multiple controls that are components typically used by developers of the controls in the System.Windows.Controls namespace and by developers creating their own controls. Examples of these components include "Thumb and RepeatButton". "ScrollBar", another component, is created using four repeat buttons (one for "line up", one for "line down", one for "page up", and one for "page down") and a "Thumb" for dragging the current view to another location in the document. In another example, "ScrollViewer" is a control created using two "ScrollBars" and one "ScrollArea" to provide a scrollable area.

The following list contains example classes exposed by the System.Windows.Controls namespace. These classes allow a user to interact with, for example, an application through various input and output capabilities as well as additional display capabilities.

AccessKey—AccessKey is a FrameworkElement element that wraps a character, indicating that it is to receive keyboard cue decorations denoting the character as a keyboard mnemonic. By default, the keyboard cue decoration is an underline.

Audio—Audio Element.

Border—Draws a border, background, or both around another element.

Button—Represents the standard button component that inherently reacts to the Click event.

Canvas—Defines an area within which a user can explicitly position child elements by coordinates relative to the Canvas area.

CheckBox—Use a CheckBox to give the user an option, such as true/false. CheckBox allows the user to choose from a list of options. CheckBox controls let the user pick a combination of options.

CheckedChangedEventArgs—This CheckedChangedEventArgs class contains additional information about the CheckedChangedEvent event.

CheckStateChangedEventArgs—This CheckStateChangedEventArgs class contains additional information about the CheckStateChangedEvent event.

ClickEventArgs—Contains information about the Click event.

ColumnStyle—Represents a changeable ColumnStyle object.

ColumnStyles—Changeable pattern IList object that is a collection of Changeable elements.

ComboBox—ComboBox control.

ComboBoxItem—Control that implements a selectable item inside a ComboBox.

ContactPickerDialog—Allows a user to select one or more contacts.

ContactPropertyRequest—Allows an application to request information about a contact property through a ContactPickerDialog. This class cannot be inherited.

ContactPropertyRequestCollection—Represents a collection of ContactPropertyRequest objects.

ContactSelection—Information about a selected contact from Microsoft® Windows® File System, code-named "WinFS" or Microsoft Active Directory®.

ContactSelectionCollection—Represents a collection of ContactSelection objects.

ContactTextBox—An edit control that supports picking contacts or properties of contacts.

ContactTextBoxSelectionChangedEventArgs—Arguments for the ContactTextBoxSelectionChanged event.

ContactTextBoxTextChangedEventArgs—Arguments for the ContactTextBoxTextChanged event.

ContactTextBoxTextResolvedEventArgs—Arguments for the TextResolvedToContact event.

ContentChangedEventArgs—The event arguments for ContentChangedEvent.

ContentControl—The base class for all controls with a single piece of content.

ContentPresenter—ContentPresenter is used within the style of a content control to denote the place in the control's visual tree (chrome template) where the content is to be added.

ContextMenu—Control that defines a menu of choices for users to invoke.

ContextMenuEventArgs—The data sent on a ContextMenuEvent.

Control—Represents the base class for all user-interactive elements. This class provides a base set of properties for its subclasses.

Decorator—Base class for elements that apply effects onto or around a single child element, such as Border.

DockPanel—Defines an area within which you can arrange child elements either horizontally or vertically, relative to each other.

DragDeltaEventArgs—This DragDeltaEventArgs class contains additional information about the DragDeltaEvent event.

FixedPanel—FixedPanel is the root element used in fixed-format documents to contain fixed pages for pagination. FixedPanel displays paginated content one page at a time or as a scrollable stack of pages.

FlowPanel—FlowPanel is used to break, wrap, and align content that exceeds the length of a single line. FlowPanel provides line-breaking and alignment properties that can be used when the flow of the container's content, Text for example, is likely to exceed the length of a single line.

Frame—An area that can load the contents of another markup tree.

Generator—Generator is the object that generates a UI on behalf of an ItemsControl, working under the supervision of a GeneratorFactory.

GeneratorFactory—A GeneratorFactory is responsible for generating the UI on behalf of an ItemsControl. It maintains the association between the items in the control's ItemsCollection (flattened view) and the corresponding UIElements. The control's item-container can ask the factory for a Generator, which does the actual generation of UI.

GridPanel—Defines a grid area consisting of columns and rows.

HeaderItemsControl—The base class for all controls that contain multiple items and have a header.

HorizontalScrollBar—The Horizontal ScrollBar class.

HorizontalSlider—The Horizontal Slider class.

HyperLink—The HyperLink class implements navigation control. The default presenter is TextPresenter.

Image—Provides an easy way to include an image in a document or an application.

IncludeContactEventArgs—Arguments passed to handlers of the ContactPickerDialog.IncludeContact event.

ItemCollection—Maintains a collection of discrete items within a control. Provides methods and properties that enable changing the collection contents and obtaining data about the contents.

ItemsChangedEventArgs—The ItemsChanged event is raised by a GeneratorFactory to inform layouts that the items collection has changed.

ItemsControl—The base class for all controls that have multiple children.

ItemsView—ItemsView provides a flattened view of an ItemCollection.

KeyboardNavigation—KeyboardNavigation class provide methods for logical (Tab) and directional (arrow) navigation between focusable controls.

ListBox—Control that implements a list of selectable items.

ListItem—Control that implements a selectable item inside a ListBox.

Menu—Control that defines a menu of choices for users to invoke.

MenuItem—A child item of Menu. MenuItems can be selected to invoke commands. MenuItems can be separators. MenuItems can be headers for submenus. MenuItems can be checked or unchecked.

PageViewer—Represents a document-viewing composite control that contains a pagination control, a toolbar, and a page bar control.

PaginationCompleteEventArgs—The event arguments for the PaginationCompleteEvent.

PaginationProgressEventArgs—The event arguments for the PaginationProgressEvent.

Pane—Provides a way to define window properties in a markup language (e.g., "XAML") without launching a new window.

Panel—Provides a base class for all Panel elements. In order to instantiate a Panel element, use the derived concrete class.

RadioButton—RadioButton implements an option button with two states: true or false.

RadioButtonList—This control serves as a grouping control for RadioButtons and is the piece that handles RadioButton mutual exclusivity. The RadioButtonList inherits from Selector. The RadioButtonList is essentially a Single SelectionMode Selector and the concept of Selection (from Selector) is keyed off of the Checked property of the RadioButton it is grouping.

RowStyle—Changeable pattern Changeable elements.

RowStyles—Changeable pattern IList object that is a collection of Changeable elements.

ScrollChangeEventArgs—The ScrollChangeEventsArgs describe a change in scrolling state.

ScrollViewer—

SelectedItemsCollection—A container for the selected items in a Selector.

SelectionChangedEventArgs—The inputs to a selection changed event handler.

SimpleText—SimpleText is a lightweight, multi-line, single-format text element intended for use in user interface (UI) scenarios. SimpleText exposes several of the same formatting properties as Text and can often be used for a performance gain at the cost of some versatility.

StyleSelector—StyleSelector allows the app writer to provide custom style selection logic. For example, with a class Bug as the Content, use a particular style for Pri1 bugs and a different style for Pri2 bugs. An application writer can override the SelectStyle method in a derived selector class and assign an instance of this class to the StyleSelector property on ContentPresenter class.

Text—Represents a Text control that enables rendering of multiple formats of Text. Text is best used within an application UI; more advanced text scenarios benefit from the additional feature set of TextPanel. In most cases where relatively simple text support is required, Text is the preferred element because of its lightweight nature and range of features.

TextBox—Represents the control that provides an editable region that accepts text input.

TextChangedEventArgs—The TextChangedEventArgs class represents a type of RoutedEventArgs that are relevant to events raised by TextRange.SetText( ).

TextPanel—Formats, sizes, and draws text. TextPanel supports multiple lines of text and multiple text formats.

ToolTip—A control to display information when the user hovers over a control.

ToolTipEventArgs—The data sent on a ToolTipEvent.

TransformDecorator—TransformDecorator contains a child and applies a specified transform to it. TransformDecorator implements logic to measure and arrange the child in its local (pre-transform) coordinates such that after the transform, the child fits tightly within the decorator's space and uses maximal area. The child therefore needs to have no knowledge that a transform has been applied to it.

UIElementCollection—A UIElementCollection is a ordered collection of UIElements.

ValueChangedEventArgs—This ValueChangedEventArgs class contains additional information about the ValueChangedEvent event.

VerticalScrollBar—The Vertical ScrollBar class.

VerticalSlider—The Vertical Slider class.

Video—Plays a streaming video or audio file in a specified rectangle within the current user coordinate system.

VisibleChangedEventArgs—The VisibleChangedEventArgs class contains additional information about the VisibleChangedEvent event.

The System.Windows.Controls namespace also contains various enumerations. The following list contains example enumerations associated with the System.Windows.Controls namespace.

CharacterCase—Specifies the case of characters in a TextBox control when the text is typed.

CheckState—Specifies the state of a control, such as a check box, that can be checked, unchecked, or set to an indeterminate state.

ClickMode—Specifies when the Click event should fire.

ContactControlPropertyPosition—Controls the position and display of the property of the contact.

ContactPickerDialogLayout—Specifies how the ContactPickerDialog should display selected properties.

ContactPropertyCategory—Specifies which value to treat as the default in the case where a property has multiple values for the user could choose from. For example, if "Work" is specified as the preferred category when requesting a phone number property from the ContactPickerDialog, and the user selects a contact with both a work and home phone number, the work phone number appears as the default selection. The user can then use the UI to choose the home phone number instead.

ContactPropertyType—Specifies a property of a contact that the ContactPickerDialog can ask the user for.

ContactType—Specifies which contact types to display in the ContactPickerDialog.

Direction—This enumeration is used by the GeneratorFactory and Generator to specify the direction in which the generator produces UI.

Dock—Specifies the Dock position of a child element within a DockPanel.

GeneratorStatus—This enumeration is used by the GeneratorFactory to indicate its status.

KeyNavigationMode—The type of TabNavigation property specify how the container will move the focus when Tab navigation occurs.

MenuItemBehavior—Defines the different behaviors that a MenuItem could have.

MenuItemType—Defines the different placement types of MenuItems.

Orientation—Slider orientation types.

PageViewerFit—Selects how pages should be fit into the PageViewer's Client area.

PageViewerMode—Selects the current PageViewer mode Reflected in the mode dropdown.

ScrollerVisibility—ScrollerVisibilty defines the visiblity behavior of a scrollbar.

SelectionMode—Specifies the selection behavior for the ListBox.

"Position" is an example structure associated with the System.Windows.Controls namespace. A user of the Generator describes positions using this structure. For example: To start generating forward from the beginning of the item list, specify position (−1, 0) and direction Forward. To start generating backward from the end of the list, specify position (−1, 0) and direction Backward. To generate the items after the element with index k, specify position (k, 0) and direction Forward.

The following list contains example delegates associated with the System.Windows.Controls namespace.

CheckedChangedEventHandler—This delegate is used by handlers of the CheckedChangedEvent event.

CheckStateChangedEventHandler—This delegate is used by handlers of the CheckStateChangedEvent event.

ClickEventHandler—Represents the methods that handle the Click event.

ContactTextBoxSelectionChangedEventHandler—A delegate handler for the ContactTextBoxSelectionChanged event.

ContactTextBoxTextChangedEventHandler—A delegate handler for the ContactTextBoxTextChanged event.

ContactTextBoxTextResolvedEventHandler—A delegate handler for the TextResolvedToContact event.

ContentChangedDelegate—Delegate for the ContentChangedEvent.

ContextMenuEventHandler—The callback type for handling a ContextMenuEvent.

DragDeltaEventHandler—This delegate is used by handlers of the DragDeltaEvent event.

IncludeContactEventHandler—Handler for ContactPickerDialog.IncludeContact event.

ItemsChangedEventHandler—The delegate to use for handlers that receive ItemsChangedEventArgs.

OpenedEventHandler—Handler for ContactPickerDialog.Opened event.

PaginationCompleteDelegate—Delegate for the PaginationCompleteEvent.

PaginationProgressDelegate—Delegate for the PaginationProgressEvent.

ScrollChangeEventHandler—This delegate is used by handlers of the ScrollChangeEvent event.

SelectionChangedEventHandler—The delegate type for handling a selection changed event.

TextChangedEventHandler—The delegate to use for handlers that receive TextChangedEventArgs.

ToolTipEventHandler—The callback type for handling a ToolTipEvent.

ValueChangedEventHandler—This delegate is used by handlers of the ValueChangedEvent event.

VisibleChangedEventHandler—This delegate is used by handlers of the VisibleChangedEvent event.

Another namespace, System.Windows.Controls.Atoms, is a sub-namespace of the System.Windows.Controls namespace. System.Windows.Controls.Atoms includes associated controls, event arguments and event handlers. The following list contains example classes associated with the System.Windows.Controls.Atoms namespace.

PageBar—Represents a scrollable pagination control.

PageElement—Renders a specific page of paginated content. The page to be rendered is specified by the PageSource property.

PageHoveredEventArgs—PageHoveredEventArgs provides information about where the mouse pointer is hovering.

PageScrolledEventArgs—The PageScrolledEventArgs contains info pertaining to the PageScrolled Event.

PageSelectedEventArgs—The PageSelectedEvent is fired when a new row/column range selection is made.

PageSelector—PageSelector: Allows the user to select a range of rows/columns of pages to be displayed.

PageSource—Identifies the source of the content to be paginated. It also provides properties and methods for formatting paginated content.

The following list contains example delegates associated with the System.Windows.Controls.Atoms namespace.

PageHoveredEventHandler—This delegate is used by handlers of the PageHoveredEvent event.

PageScrolledEventHandler—This delegate is used by handlers of the PageHovered event.

PageSelectedEventHandler—This delegate is used by handlers of the PageSelectedEvent event.

A System.Windows.Controls.Primitives namespace is another sub-namespace of the System.Windows.Controls namespace. As mentioned above, the Primitives sub-namespace includes controls that are intended to be used as primitives by other more complex controls. The following list contains example classes associated with the System.Windows.Controls.Primitives namespace.

ButtonBase—When overridden in a derived class, defines the relevant events and properties, and provides handlers for the relevant input events.

Popup—A control that creates a fly-out window that contains content.

RangeBase—Represents the base class for elements that have a specific range. Examples of such elements are scroll bars and progress bars. This class defines the relevant events and properties, and provides handlers for the events.

RepeatButton—RepeatButton control adds repeating semantics of when the Click event occurs.

ScrollArea—ScrollArea is the effective element for scrolling. It contains content that it clips and provides properties to expose the content's offset and extent. It also provides default input handling such that scrolling can be driven programatically or via keyboard or mouse wheel.

ScrollBar—The ScrollBar class.

Selector—The base class for controls that select items from among their children.

Slider—The Slider class.

Thumb—The thumb control enables basic drag-movement functionality for scrollbars and window resizing widgets.

"IEnsureVisible" is an example interface associated with the System.Windows.Controls.Primitives namespace. IEnsureVisible is implemented on a visual to scroll/move a child visual into view.

The following list contains example enumerations associated with the System.Windows.Controls.Primitives namespace.

ArrowButtonStates—

CloseModeType—Describes how a popup should behave to various mouse events.

Part—The Part enumeration is used to indicate the semantic use of the controls that make up the scroll bar.

Part States—ScrollBar Part States.

PlacementType—Describes where a popup should be placed on screen.

SizeBoxStates—

A documents namespace 312 is a collection of semantic and formatting elements that are used to create richly formatted and semantically rich documents. In one embodiment, an "element" is a class that is primarily used in conjunction with a hierarchy of elements (referred to as a "tree"). These elements can be interactive (e.g., receiving user input via keyboard, mouse or other input device), can render images or objects, and can assist with the arrangement of other elements. Example elements include a "Block" element that implements a generic block, a "Body" element that represents content that includes the body of a table, a "Cell" element that contains tabular data within a table, a "Header" element that represents the content included in the header of a table, and a "PageBreak" element that is used to break content across multiple pages.

The following list contains example classes exposed by the System.Windows.Documents namespace.

AdaptiveMetricsContext—AdaptiveMetricsContext provides the root element for adaptive-flow-format documents. Once a child panel is encapsulated in an AdaptiveMetricsContext element, the content of the panel is processed by the Reading Metrics Engine (RME). The size of the child panel is used to calculate the number and size of any columns as well as optimum font sizes and line heights.

Block—Implements a generic block element that does not induce default rendering behavior.

BlockElement—Implements a base class for all Block elements.

Body—Represents the content that comprises the body of a Table element.

Bold—Implements a Bold element derived from Inline.

BreakRecord—Stores information necessary to continue formatting paginated content across page breaks. Inherit from this class to provide pagination support. This is an abstract class.

Cell—Cells contain tabular data within a Table. Cell elements are contained within a Row.

CellCollection—Ordered collection of table cells.

Column—The Column element is used to apportion the contents of a GridPanel or Table.

ColumnCollection—A ColumnCollection is an ordered collection of Columns.

ColumnResult—Represents a column's view-related information.

ContainerParagraphResult—Provides access to calculated layout parameters for a Paragraph object which contains only other Paragraph objects.

ContentPosition—Represents the position of content within a paragraph. Inherit from this class to describe the position of associated content. This is an abstract class.

Document—The purpose of the Document class is to decouple the content of a document from the UI "chrome" that surrounds it. "Decoupling" means that you can author a document without thinking about (and without committing to) its UI. The Document class holds document content, typically a TextPanel or a FixedPanel and its children. A visual tree (by default, a PageViewer) is associated with this element through the WPP control styling mechanism.

DocumentPage—Represents layout information for a control associated with a page of a document subject to pagination. Inherit from this class to implement to describe the layout information for these controls. This is an abstract class.

DocumentPageParagraphResult—Provides access to calculated layout parameters for objects affected by pagination.

FindEngine—Base class for find algorithms.

FindEngineFactory—Find algorithms factory.

FixedPage—Provides access to a single page of content within a fixed-format layout document.

Footer—Represents the content that comprises the footer of a Table element.

Header—Represents the content that comprises the header of a Table element.

Heading—Implements a block-level element that renders text as a heading.

HyphenationDictionary—HyphenationDictionary represents a dictionary for the purpose of providing hyphenation support within applications. It can contain both an inline dictionary and a reference to an external dictionary. The inline dictionary has higher priority and will be applied before entries in the external dictionary.

Hyphenator—The Hyphenator object maintains reference to hyphenation data within a HyphenationDictionary and also performs hyphenation.

Inline—Implements a generic Inline element that does not induce any default rendering behavior.

InlineElement—Implements a generic inline element as base class for all inline elements.

Italic—Implements an Italic element derived from Inline.

LineBreak—Represents a markup element that forces a line break.

LineResult—Provides access to calculated information of a line of text.

List—Implements a List element. Lists are block-level elements designed to be formatted with markers such as bullets or numbering.

ListElementItem—Implements a ListElementItem, which supports markers such as bullets or numbering.

Note—Implements a Note element, which is analogous to the note element in HTML.

PageBreak—Represents a markup element used to break content across various pages.

PageDescriptor—Implements PageDescriptor, which stores information necessary to create paginated layout.

Paragraph—Implements a block-level element used to render text in a paragraph. Rendering behavior is analogous to that of the paragraph element in HTML.

ParagraphResult—Provides access to calculated layout parameters for a Paragraph object.

Row—Defines a row within a GridPanel or Table element.

RowCollection—RowCollection represents an ordered collection of Rows.

RowGroup—Specifies property defaults for a group of rows in a Table or GridPanel.

Section—Implements a generic container element. Rendering behavior is analogous to the div element in HTML.

SmallCaps—Implements an inline SmallCaps element. SmallCaps are typographic forms that render as small capital versions of letters for emphasis, as in a title.

Subscript—Represents an inline Subscript element. Subscript characters are written immediately below, below and to the left, or below and to the right of other characters.

Superscript—Represents an inline Superscript element. Superscript characters are typically letters or numbers and render immediately above, above and to the left, or above and to the right of other characters.

Table—Table is used to display complex data in tabular form using a markup language (e.g., "XAML").

TextArray—Base API for text access and manipulation.

TextChangedEventArgs—The TextChangedEventArgs defines the event arguments sent when a TextArray is changed.

TextElement—TextElement provides TextRange facilities for the TextTree. It is an immutable, continuous TextRange with fixed endpoints. It provides ContentElement Input, Focus and Eventing support. It also provides DependencyObject property support.

TextNavigator—This can enumerate text content. Implements a movable TextPosition. It can move by text run or be positioned at a know location in text.

TextParagraphResult—Provides access to calculated layout parameters for text, including floated objects and figures.

TextPosition—This is an object representing a certain position in a TextArray. A compact object representing a position in text automatically maintains position when text changes. Comparison operations are only applicable to positions within same TextArray (same Context) TextPosition can be static or movable. IsChangeable property tells the kind of position.

TextRange—TextRange is an abstract class providing generic association of zero or more subranges with properties. Subrange manipulation is defined on derived classes.

TextRangeMovable—TextRangeMovable is an abstract class for movable TextRanges. It adds the ability to move the start and end points based on TextUnits.

TextTreeChangedEventArgs—The TextChangedEventArgs defines the event arguments sent when a TextArray is changed.

TextTreeDumper—TreeDumper is a tree test class that is public due to packaging issues.

TextTreeNavigator—This is an object representing a certain moveable position in a TextTree. It is a specific implementation of TextNavigator for use only in the TextTree.

TextTreePosition—This is an object representing a certain immutable position in a TextTree. It is a specific implementation of TextPosition for use only in the TextTree.

TextTreeRange—Provides TextRange facilities for the TextTree. It is a mutable, continuous TextRange with movable endpoints.

TextTreeRangeContentEnumerator—Enumerator on object children directly under a TextTreeRange.

TextUnit—Extensible unit of text navigation.

TextUnits—Commonly used text units for TextPosition and TextRange.

Typography—Provides access to a rich set of OpenType typography properties.

UIElementParagraphResult—The ParagraphResult for a paragraph which is composed entirely of a UIElement. Used for Floaters, Figures and embedded block level UIElements.

Underline—Implements an Underline element derived from InlineElement.

The following list contains example interfaces associated with the System.Windows.Documents namespace.

IDocumentContentHost—Implement this interface on a content host so that children of that host can notify the host when content is changing.

IDocumentFormatter—Implement this interface on an element to provide support for document features such as pagination.

ITextDocumentResult—Implement this interface to maintain column information for a document.

ITextParagraphResult—Implement this interface to provide text and positioning information for text paragraphs.

The following list contains example enumerations associated with the System.Windows.Documents namespace.

ElementEdge—This identifies the edge of an object where a TextPosition is located.

FindAdvancedOptions—The advanced search options used by FindAlgorithm (search initialization) and TextRangeMovable/TextSelection (simplified search execution) classes.

FindOptions—The simplified search options used by TextBox.Find methods.

LogicalDirection—LogicalDirection defines a logical direction for movement in text. It is also used to determine where a TextPosition will move when content is inserted at the TextPosition.

TextArrayRunType—This identifies the run where a TextPosition is located, taking LogicalDiretion into account.

TextChangeOptions—Possible text changes for CanChangeText.

TextMoveOptions—This controls the movement of TextNavigator by specifying conditions to halt navigation.

The following list contains example delegates associated with the System.Windows.Documents namespace.

ObjectCloneDelegate—Callback method to provide a clone or copy of a DependencyObject when a portion of a TextArray is being copied or moved.

TextChangedEventHandler—The TextChangedEventHandler delegate is called with TextChangedEventArgs every time content is added to or removed from the TextTree.

A shapes namespace 314 is a collection of vector graphics elements used to create images and objects. The use of vector graphics elements allows the elements to be easily resized to fit the requirements of a particular interface or display device. The following list contains example classes exposed by the System.Windows.Shapes namespace.

Ellipse—Draws an ellipse.

Glyphs—Represents a glyph shape in a markup language such as "XAML". Glyphs are used to represent fonts.

Line—Draws a straight line between two points.

Path—Draws a series of connected lines and curves.

Polygon—Draws a polygon (a connected series of lines that forms a closed shape).

Polyline—Draws a series of connected straight lines.

Rectangle—Draws a rectangle.

Shape—An abstract class that provides base functionality for shape elements, such as ellipse, polygon and rectangle.

The System.Windows.Controls, System.Windows.Documents and System.Windows.Shapes namespaces provide an integrated system for developing applications and related components. This integrated system provides a common programming model for all three namespaces, thereby simplifying development of application programs. This interoperability among all three namespaces allows developers to learn a single programming architecture that is applied to any of the features provided by three namespaces. For example, a common markup language is used across all three namespaces. This common markup language provides for the mapping of classes and properties specified in XML markup to an instantiated tree of objects.

Additionally, a consistent programming model and consistent services are used across the three namespaces. For example, a consistent event system is used to initiate and process various events. A common property system is used to style various properties, bind data to a property, or animate a property, regardless of whether the property is associated with the "Controls", "Documents", or "Shapes" namespace. Additionally, the same input paradigms and layout handling is common across all three namespaces. For example, various controls from the System.Windows.Controls namespace can be nested in the middle of a document's content defined using the System.Windows.Documents namespace.

Example source files will include a set of windows and panes (also referred to as "pages") that are declaratively defined using "Controls", "Documents" and "Shapes". Interaction logic is also provided for the windows and panes. The interaction logic identifies program code that is executed in response to a particular user action or in response to occurrence of an event or activity. The interaction logic is defined, for example, using a Common Language Runtime (CLR) language. A CLR is a runtime environment that handles execution of program code (e.g., .NET program code) and provides various services such as security-related services and memory-related services. Example CLR languages include C# and visual basic. Source files may also include other stand-alone programming language files, such as C# or visual basic files.

Although this discussion refers to the integration of the "Controls", "Documents" and "Shapes" namespaces, this integration may be applied to any or all of the namespaces and sub-namespaces discussed herein.

A data namespace 316 includes classes and interfaces used to bind properties of elements to data sources, data source classes, and data-specific implementations of data collections and views. These classes and interfaces are also used to handle exceptions in data entry and allow runtime creation of a user interface based on information in various data sources. Data can be displayed in textual form or can be utilized to change the formatting of the display, such as displaying dollar amounts in red if they are negative. Example classes include a "Bind" class that represents a binding declaration object that manages bindings between a dynamic property user interface and source data, and an "XmlDataSource" class that serves as a data source for data binding to XML content nodes.

A media namespace 318 provides various media classes. Application developers as well as component developers may use these classes to develop various presentation functionality. Example classes in media namespace 318 include an "ImageEffect" class that permits certain imaging effects (e.g., blur and grayscale), and a "Brush" class that provides a mechanism for filling an area using solid colors, gradients, images, video, and the like.

The media namespace 318 includes a sub-namespace System.Windows.Media.Animation that includes services that allow a developer to animate properties and coordinate a set of animations with a set of timelines. An animation is an object that changes a value over a period of time. Animation effects include moving an object on the display, and changing the size, shape, or color of an object. Multiple animation classes are provided to implement various animation effects. Effects can be achieved by associating an animation with an element's property value. For example, to create a rectangle that fades in and out of view, one or more animations are associated with the opacity property of the rectangle.

The media namespace 318 also includes a sub-namespace System.Windows.Media.TextFormatting that provides various text services. For example, a "TextFormatter" text engine provides services for breaking text lines and formatting text presented on a display. "TextFormatter" is capable of handling different text character formats and paragraph styles as well as handling international text layout.

A design namespace 320 provides classes that enable the editing of forms and text, formatting data and cross-process data sharing. These classes provide an extensible framework for editing documents, applications, and other content.

An input namespace 322 includes an input manager that coordinates inputs received by the system. The input namespace 322 also includes classes that help manage and provide control for different input devices, such as a keyboard or a mouse.

A navigation namespace 324 provides a set of classes and services that allow the building of applications with navigation paradigms, such as a browser application. These classes and services permit the development of applications with customized navigation experiences. For example, when purchasing a product or service from an online merchant, clicking a "Back" button causes the application to display a different page that asks the user if they want to cancel or change their order. In another example, activating a "Refresh" button causes an application to retrieve new data instead of first reloading the application followed by retrieving the new data. The navigation namespace 324 also includes page functions that provide a mechanism for generating a hierarchy of questions that are presented to a user.

An automation namespace 326 provides a set of classes that support accessibility and user interface automation.

A serialization namespace 328 provides a parser that can load or save a hierarchy of objects (e.g., elements) from or to an XML file or a file with a binary representation. This process also sets properties associated with the objects and associates event handlers.

An interop namespace 330 provides a set of classes that enable interoperability with other operating systems or computing platforms.

A forms.interop namespace 332 provides an element that allows an application to host a form control operation.

Another namespace, System.IO.CompoundFile (not shown in FIG. 3) provides services to utilize a compound file in which various document distributable files are stored. These services allow for the encryption and compression of content. The services also support the storage of multiple renditions of the same content, such as a re-flowable document and a fixed-format document.

Exemplary Computing System and Environment

Figure 4:
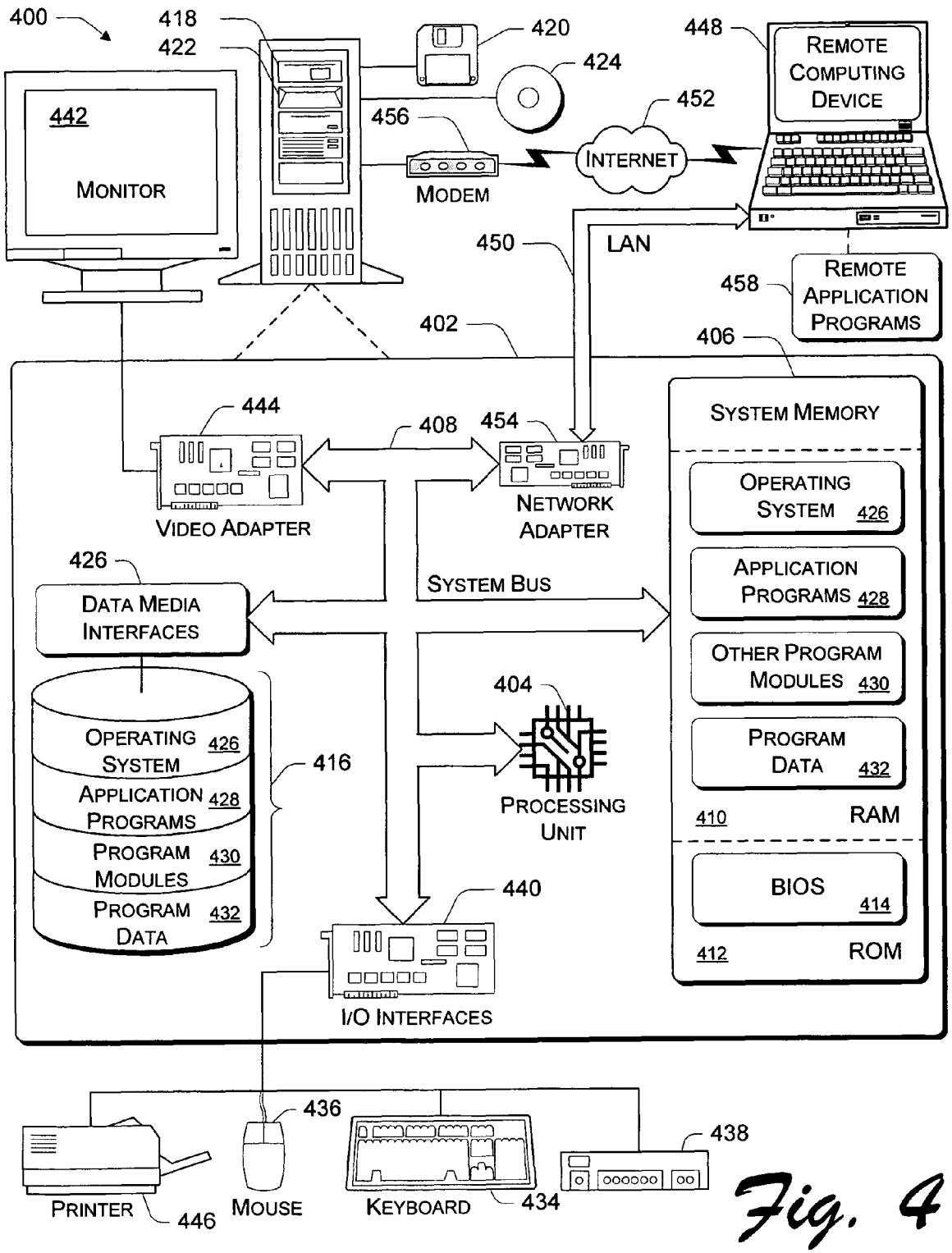
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is only one example of a computing environment and is not intended to suggest any limitation as to the scope of use or functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that are linked through a communications network. In a distributed computing environment, program modules may be located in both local and remote computer storage media including memory storage devices.

The computing environment 400 includes a general-purpose computing device in the form of a computer 402. The components of computer 402 can include, by are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 5:
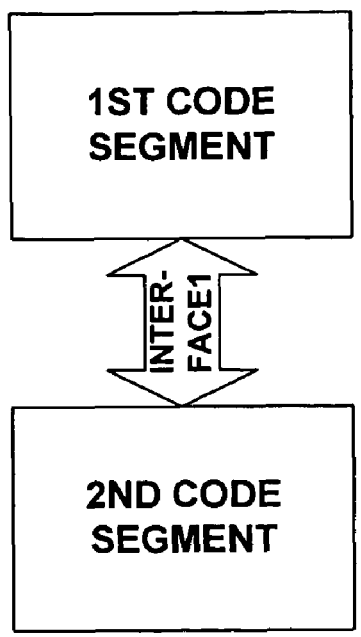
FIGS. 5, 6, 7, 8, 9, 10, 11, 12, 13, 14, 15 and 16 illustrate various example implementations of a programming interface.
Figure 6:
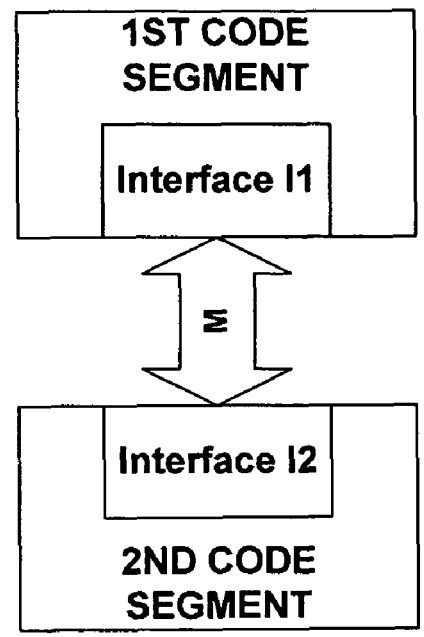

Notionally, a programming interface may be viewed generically, as shown in FIG. 5 or FIG. 6. FIG. 5 illustrates an interface Interface1 as a conduit through which first and second code segments communicate. FIG. 6 illustrates an interface as comprising interface objects I1 and I2 (which may or may not be part of the first and second code segments), which enable first and second code segments of a system to communicate via medium M. In the view of FIG. 6, one may consider interface objects I1 and I2 as separate interfaces of the same system and one may also consider that objects I1 and I2 plus medium M comprise the interface. Although FIGS. 5 and 6 show bi-directional flow and interfaces on each side of the flow, certain implementations may only have information flow in one direction (or no information flow as described below) or may only have an interface object on one side. By way of example, and not limitation, terms such as application programming or program interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 5 and 6, but they nonetheless perform a similar function to accomplish the same overall result. We will now briefly describe some illustrative alternative implementations of a programming interface.

A. Factoring

Figure 7:
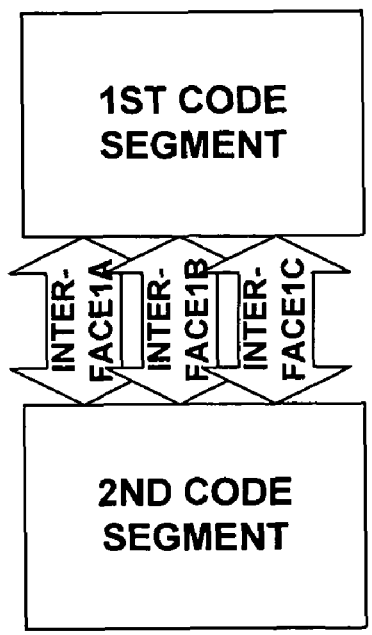
Figure 8:
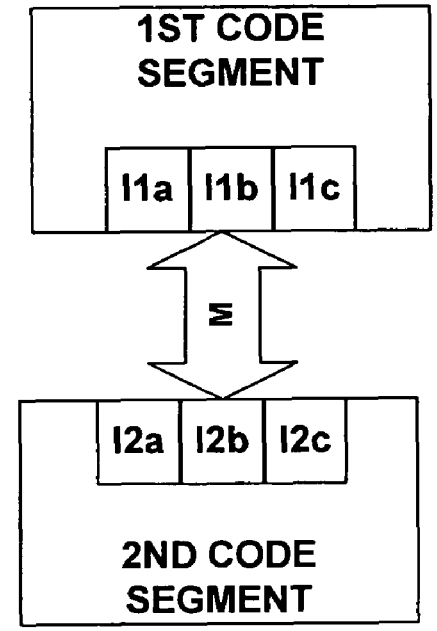

A communication from one code segment to another may be accomplished indirectly by breaking the communication into multiple discrete communications. This is depicted schematically in FIGS. 7 and 8. As shown, some interfaces can be described in terms of divisible sets of functionality. Thus, the interface functionality of FIGS. 5 and 6 may be factored to achieve the same result, just as one may mathematically provide 24, or 2 times 2 times 3 times 2. Accordingly, as illustrated in FIG. 7, the function provided by interface Interface1 may be subdivided to convert the communications of the interface into multiple interfaces Interface1A, Interface 1B, Interface IC, etc. while achieving the same result. As illustrated in FIG. 8, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 7 and 8, the functional spirit of interfaces Interface1 and I1 remain the same as with FIGS. 5 and 6, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 9:
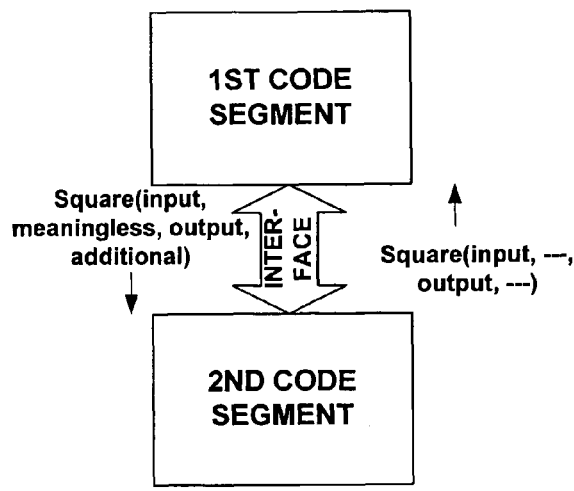
Figure 10:
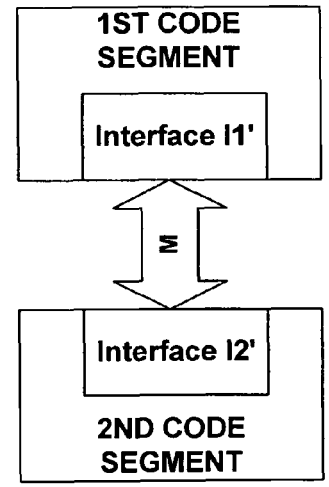

In some cases, it may be possible to ignore, add or redefine certain aspects (e.g., parameters) of a programming interface while still accomplishing the intended result. This is illustrated in FIGS. 9 and 10. For example, assume interface Interface1 of FIG. 5 includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 9, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 10, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 11:
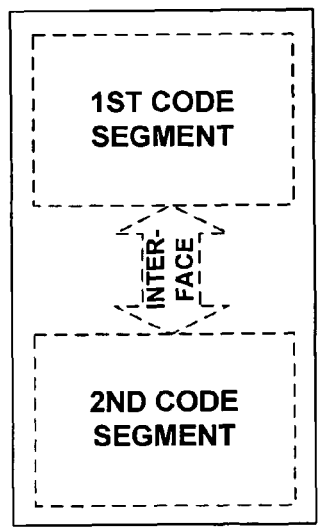
Figure 12:
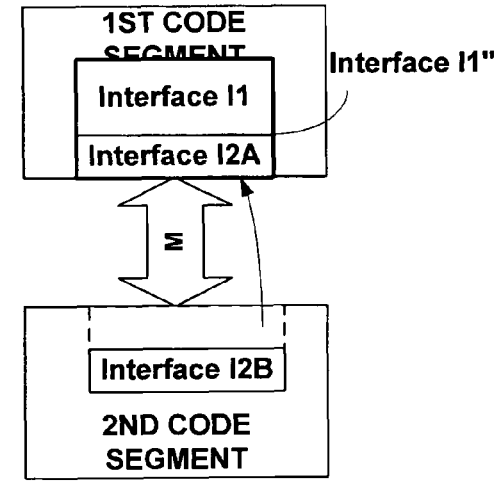

It may also be feasible to merge some or all of the functionality of two separate code modules such that the "interface" between them changes form. For example, the functionality of FIGS. 5 and 6 may be converted to the functionality of FIGS. 11 and 12, respectively. In FIG. 11, the previous $1^{st}$ and $2^{nd}$ Code Segments of FIG. 5 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 12, part (or all) of interface I2 from FIG. 6 may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 6 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 13:
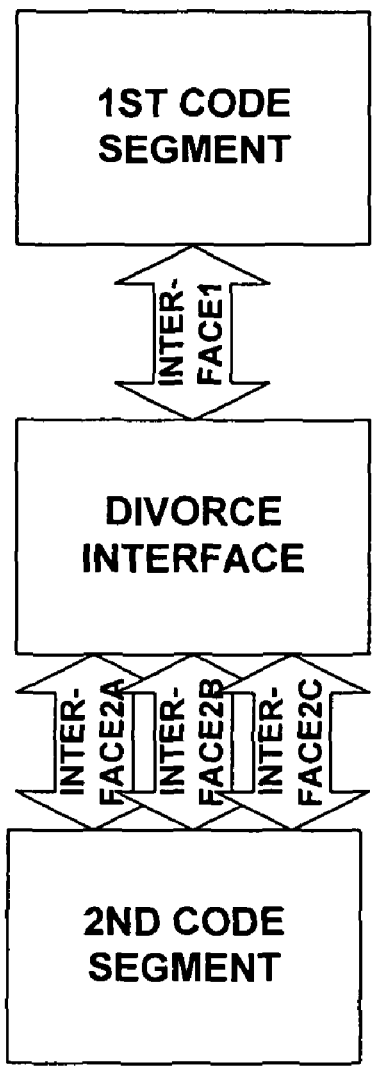
Figure 14:
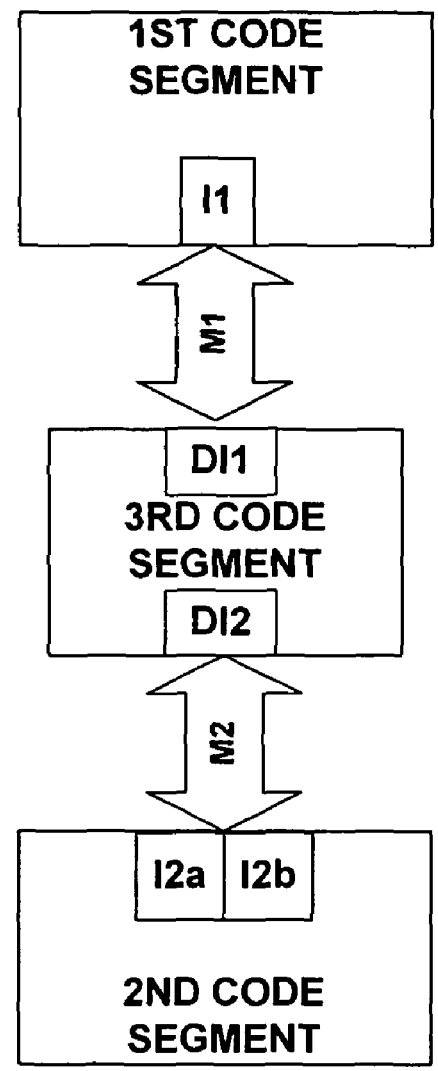

A communication from one code segment to another may be accomplished indirectly by breaking the communication into multiple discrete communications. This is depicted schematically in FIGS. 13 and 14. As shown in FIG. 13, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 14, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 6 to a new operating system, while providing the same or similar functional result.

E. Rewriting

Figure 15:
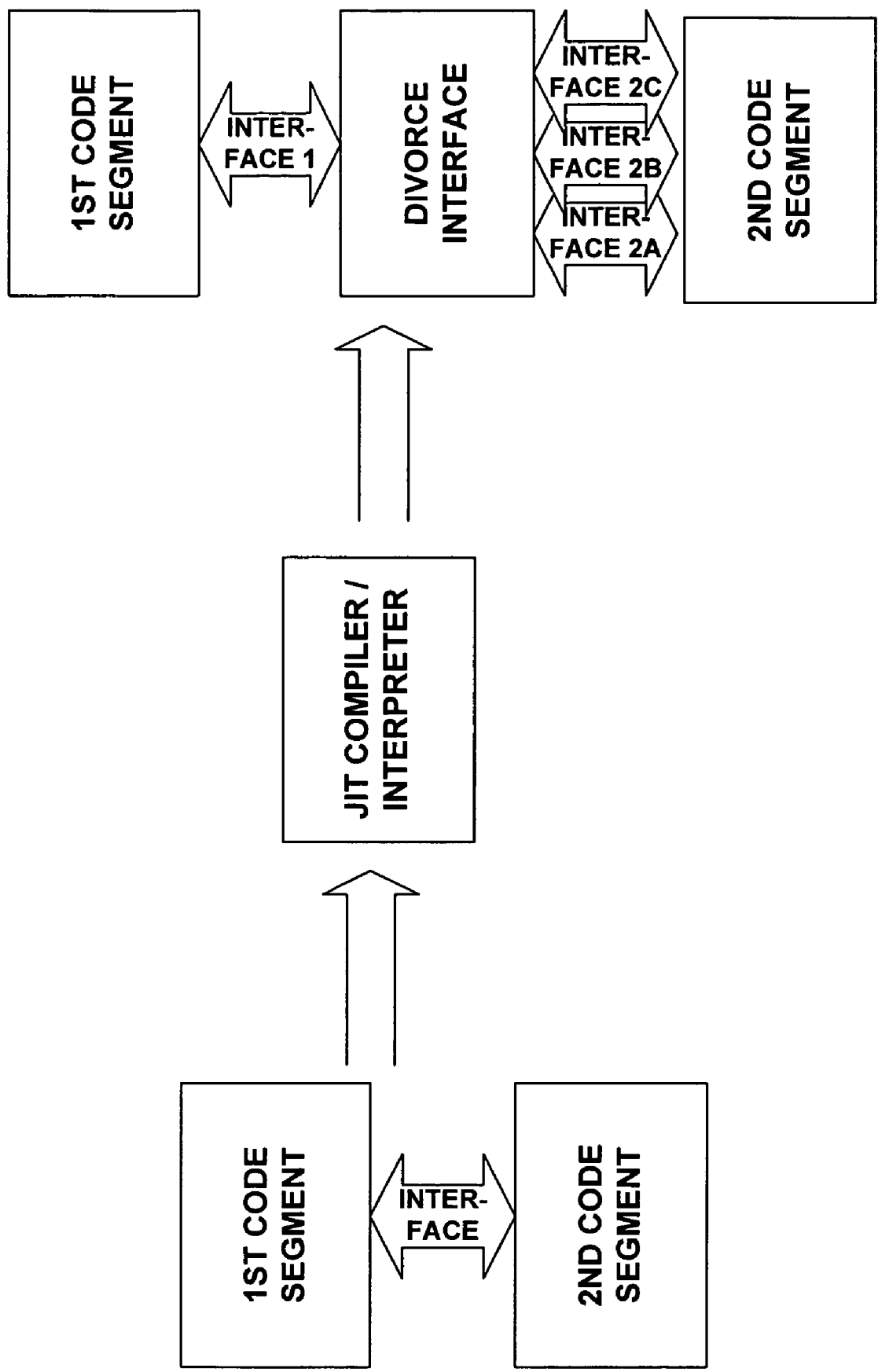
Figure 16:
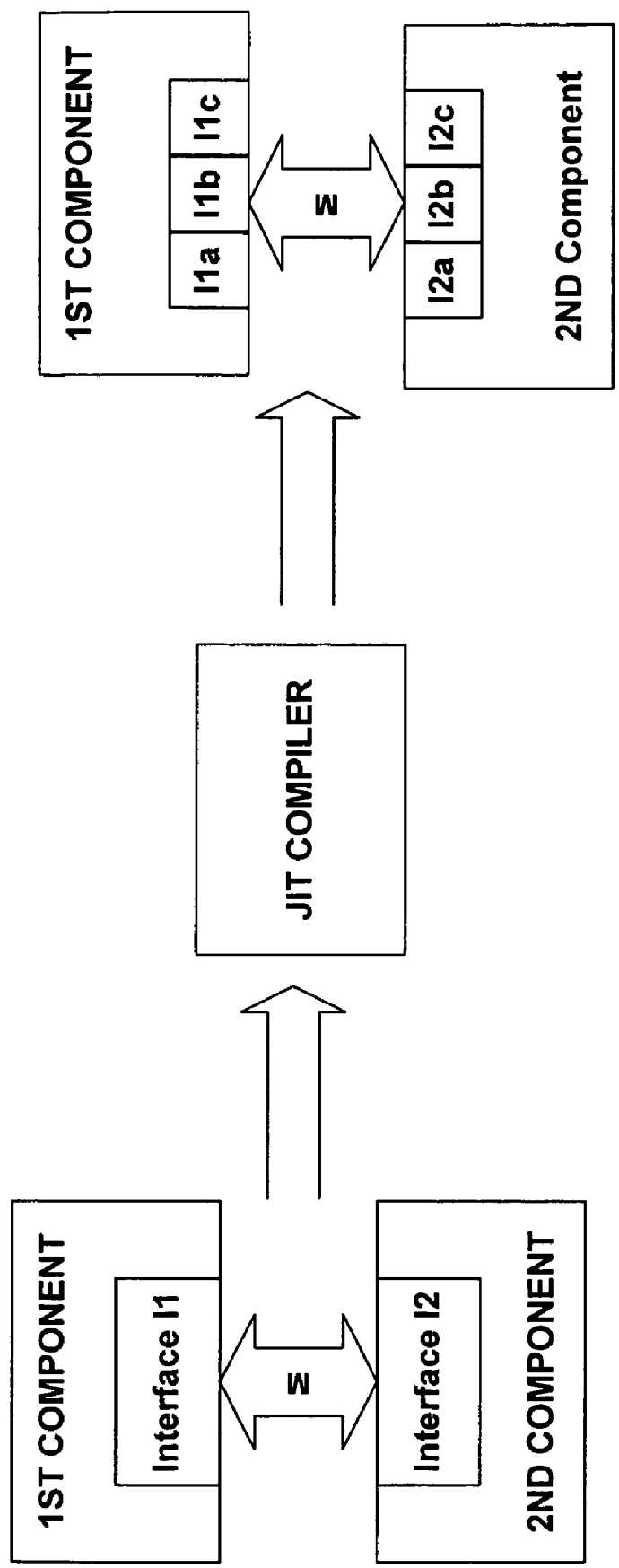

Yet another possible variant is to dynamically rewrite the code to replace the interface functionality with something else but which achieves the same overall result. For example, there may be a system in which a code segment presented in an intermediate language (e.g. Microsoft IL, Java© Byte-Code, etc.) is provided to a Just-in-Time (JIT) compiler or interpreter in an execution environment (such as that provided by the .Net framework, the Java© runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 15 and 16. As can be seen in FIG. 15, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 16, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 5 and 6. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A programming interface embodied on one or more computer readable storage media having computer-executable instructions for performing steps comprising:

generating graphical objects using a first group of services, wherein the first group of services includes a service that customizes a behavior of the graphical objects to style and/or theme the graphical objects, the service including interfaces for controlling a behavior of a menu item, for controlling a visibility behavior of a scroll bar, and for controlling selection behavior of a listbox;

formatting content using a second group of services, wherein the second group of services arranges the graphical objects;

creating components of the graphical objects using a third group of services;

binding elements to data sources, data source classes, and data specific implementations of data collections using a fourth group of services, wherein the fourth group of services further handle exceptions in data entry;

providing a plurality of media classes using a fifth group of services, the media classes enabling image effects to be applied to portions of images and coordinating a set of animations with a set of timelines;

providing classes using a sixth group of services that enable editing of forms and text, formatting data, and cross-process data sharing;

instantiating an input manager using a seventh group of services, the input manager coordinating inputs received by the system;

providing a set of classes and services using an eighth group of services that allow building of applications with navigation paradigms;

providing a set of classes using a ninth group of services that support accessibility and user interface automation;

providing a parser using a tenth group of services that can load or save a hierarchy of objects from or to an extensible markup language (XML) or binary file and set properties associated with objects and event handlers;

providing a set of classes using an eleventh group of services that enable interoperability with other operating systems or computer platforms;

providing an element using a twelfth group of services that allows an application to host a form control operation;

using a common markup language to map classes and properties specified in the markup language to an instantiated tree of objects across the groups of services; and integrating the groups of services using a consistent programming model and consistent services across the service groups.

2. A programming interface as recited in claim 1, wherein the groups of services share a common event system.

3. A programming interface as recited in claim 1, wherein the groups of services share a common property definition system.

4. A programming interface as recited in claim 1, wherein the groups of services share a common input paradigm.

5. A programming interface as recited in claim 1, wherein the groups of services share a common system for nesting elements associated with a particular group of services within elements associated with another group of services.

6. A programming interface as recited in claim 1, wherein the first group of services includes a service that determines an appearance of the graphical objects.

7. A programming interface as recited in claim 1, wherein the first group of services includes a service that determines an arrangement of the graphical objects.

8. A programming interface as recited in claim 1, wherein the first group of services includes a plurality of nested elements that define the graphical objects.

9. A programming interface as recited in claim 1, wherein the graphical objects are comprised of one or more elements defined by vector graphics.

10. A programming interface as recited in claim 1, wherein the first group of services can define window properties in a markup language without launching a new window.

11. A programming interface as recited in claim 1, wherein the first group of services generate a user interface containing a plurality of graphical objects.

12. A software architecture comprising the programming interface as recited in claim 1.

13. A programming interface as recited in claim 1, wherein the third group of services includes services to generate geometric shapes.

14. A programming interface as recited in claim 1, wherein the second group of services includes arranging a plurality of data elements.

15. A computer system including one or more microprocessors and one or more software programs, the one or more software programs utilizing a programming interface to request services from an operating system, the programming interface including separate commands to request services consisting of the following groups of services:

a first group of services for generating graphical objects, wherein the first group of services includes a service that customizes a behavior of the graphical objects to style and/or theme the graphical objects, the service including interfaces for controlling a behavior of a menu item, for controlling a visibility behavior of a scroll bar, and for controlling selection behavior of a listbox;

a second group of services for formatting content, wherein the second group of services arranges the graphical objects;

a third group of services for creating components of the graphical objects; and a fourth group of services that bind elements to data sources, data source classes, and data specific implementations of data collections, wherein the fourth group of services further handle exceptions in data entry;

a fifth group of services for providing a plurality of media classes that enable image effects to be applied to portions of images and coordinate a set of animations with a set of timelines;

a sixth group of services for providing classes that enable editing of forms and text, formatting data, and cross-process data sharing;

a seventh group of services for instantiating an input manager that coordinates inputs received by the system;

an eighth group of services for providing a set of classes and services that allow building of applications with navigation paradigms;

a ninth group of services for providing a set of classes that support accessibility and user interface automation;

a tenth group of services for providing a parser that can load or save a hierarchy of objects from or to an extensible markup language (XML) or binary file and that sets properties associated with objects and event handlers;

an eleventh group of services for providing a set of classes that enable interoperability with other operating systems or computer platforms; and a twelfth group of services for providing an element that allows an application to host a form control operation, wherein the groups of services are integrated by sharing a common programming model, consistent services and using a common markup language to map classes and properties specified in the markup language to an instantiated tree of objects across the groups of services.

16. A computer system as recited in claim 15, wherein the first group of services includes:

a service for defining an appearance of the graphical objects.

17. A computer system as recited in claim 15, wherein the third group of services includes services to generate a plurality of geometric shapes.

* * * * *